United States Patent [19]

Tuttle

[11] 4,212,685

[45] Jul. 15, 1980

[54] PROTECTIVE AND COLOR RECEPTIVE COATING FOR ALUMINUM

[75] Inventor: James N. Tuttle, Bedford, Mass.

[73] Assignee: Lea Manufacturing Company, Waterbury, Conn.

[21] Appl. No.: 968,104

[22] Filed: Dec. 11, 1978

[51] Int. Cl.$^2$ ............................ C23B 9/02; C23F 7/14

[52] U.S. Cl. .................................... 148/6.1; 148/6.27; 204/35 N

[58] Field of Search ................. 148/6.1, 6.27; 204/58, 204/42, 35 N

[56] References Cited

U.S. PATENT DOCUMENTS

| | | | |
|---|---|---|---|
| 1,735,286 | 11/1929 | Kujirai et al. | 204/58 |
| 2,290,364 | 7/1942 | Tosterud | 148/6.27 |
| 2,408,910 | 10/1946 | Burnham | 204/58 |
| 3,275,537 | 9/1966 | Petin | 204/58 |
| 3,284,202 | 11/1966 | Leonard | 148/6.27 |
| 3,374,155 | 3/1968 | Weber | 148/6.27 |
| 4,024,039 | 5/1977 | Yoshida et al. | 204/58 |

*Primary Examiner*—Ralph S. Kendall

[57] ABSTRACT

The invention is for a process for providing a protective, color receptive coating over aluminum using chemical means without a requirement for the use of an electric current as in electrical anodizing. Absent conventional steps such as water rinses, the process comprises cleaning, including desmutting of the surface of an aluminum part as necessary, and treatment with an aqueous alkaline solution of ferric citrate for a time sufficient to provide the coating over the part. The treated aluminum part has enhanced corrosion resistance and the coating over the part acts as a base for other coatings such as paint, and is readily dyed.

19 Claims, No Drawings

4,212,685

PROTECTIVE AND COLOR RECEPTIVE COATING FOR ALUMINUM

BACKGROUND OF THE INVENTION

Introduction

This invention relates to the formation of protective and color receptive coatings over an aluminum part and more particularly, to a process and composition for formation of said coatings using chemical means.

Description of the Prior Art

Methods for providing an integral oxide coating on aluminum are well known in the art. These coatings are corrosion resistant, may be dyed, and act as bases for various finishes such as paint. The most common method for forming such a coating is by anodizing. This is an electrochemical method involving the formation of an oxide coating by passing a current through an electrolyte such as a sulphuric acid or a chromic acid solution using an aluminum part as the anode and the tank containing the electrolyte as the cathode. Following formation of the oxide coating, the aluminum part may be immersed in a dye bath to impart the desired color to the surface of the aluminum part. A process for anodizing aluminum is disclosed in the *Metal Finishing Guidebook Directory* for 1967, Metals and Plastics Pulbications, Inc., Westwood, N.J., pages 515 to 525.

Though anodizing is widely used, it has drawbacks such as high cost due to energy requirements and the need for special equipment such as electrodes, a rectifier and special lead lined stainless steel tanks. Another disadvantage relates to anodizing of small parts since each part must have an electrical connection. Hence, time consuming and costly procedures are needed when anodizing such parts.

These are also chemical methods for coloring aluminum such as disclosed in U.S. Pat. No. 2,796,371. In the process of this patent, there is disclosed an acidic treatment solution comprising a mixture of (1) a chromic compound selected from the group of chromic acid and water soluble salts thereof and (2) a ferricyanide acid and water soluble salts thereof. It is believed that a complex between the aluminum and chromic acid is formed which is color receptive. The process is essentially a room temperature operation with pH adjusted to a maximum of 3. A part is treated by immersion in the above solution for a brief time, typically 5 minutes, and then colored using an organic finish such as a paint, lacquer or dye. Dyed surfaces obtained using this procedure are not uniform nor are they decorative in that the colors produced have a tendency to be irridescent. Further, chromic acid is a difficult material to dump after the treatment solution is spent.

In commonly owned U.S. Pat. No. 3,765,952 granted Oct. 16, 1973, a chemical process for treating aluminum to provide a corrosion resistant coating is disclosed. The coating is readily dyed and receptive to various finishes. The process comprises cleaning and desmutting an aluminum part and contacting the part with an aqueous alkaline solution of a ferricyanide compound for a time sufficient to form a coating. If desired, the aluminum part may then be dyed or coated with any other suitable finish such as paint, a lacquer of the like. The major step in the aforesaid process is treatment with the aqueous alkaline ferricyanide solution. This is considered analagous to the formation of film in electrical anodizing.

The process of the above patent overcomes the disadvantage with respect both to electrical anodizing and to the chemical treatment process described in U.S. Pat. No. 2,796,371. With respect to anodizing, expensive electrical equipment and special tanks are not required. Consequently, large and small parts are conveniently treated, the small parts using barrel techniques since electrical connections are not required. With respect to the chemical process of U.S. Pat. No. 2,796,371, the process is an improvement in that the coatings are harder, possess better corrosion resistance and when dyed, the color is more uniform, brighter and substantially more desirable. Further, with suitable treatment and replenishment, the treatment baths have long life.

SUMMARY OF THE INVENTION

The subject invention provides alternative materials for treatment of an aluminum part to provide protective coatings that are readily dyed. The process comprises cleaning and desmutting an aluminum part to the extent required by methods known to those skilled in the art, and contacting the aluminum part with an aqueous alkaline solution of ferric citrate for a time sufficient to coat the surface of the part. If desired, the coated aluminum part may be dyed with a suitable dye to provide a desired color to the part or may be coated with another suitable finish such as paint, lacquer or the like.

DESCRIPTION OF THE PREFERRED EMBODIMENTS

The invention described herein relates to treatment of aluminum parts where an aluminum part is defined as a part fabricated from aluminum and includes articles coated with aluminum such as vacuum metallized plastic and glass. For coated articles, the thickness of the aluminum coating is not critical, though extremely thin coatings, e.g., 200 angstroms, or less, are attacked by the treatment solution to the extent that a coating meeting the requirements of this invention may not be formed. The thinner the coating, the greater is the need for caution in the use of the treatment solution as will be described in greater detail below.

Prior to treatment of an aluminum part in accordance with this invention, the part is preferably cleaned as necessary following, for example, the procedures set forth in U.S. Pat. No. 3,765,952. For example, cleaning can be a combination of steps comprising solvent degreasing, preferably with a hydrocarbon solvent such as benzene to remove grease and oil or by soak cleaning. Thereafter, the part may be etched with a mild acid or alkaline cleaner to remove dirt, oxides and other contamination but not so as to form visible surface irregularities. Finally, if necessary, the part may be treated with a conventional desmutter to remove any residues that may be left on the surface of the part. Such a desmutter could comprise a mixture of dilute nitric and hydrofluoric acid. Intermediate between each of the aforesaid steps would be a water rinse. The next step in the process comprises formation of a color receptive coating using an aqueous, alkaline solution of ferric citrate.

The concentration of the ferric citrate in the solution is not critical, from 0.01 moles per liter to saturation being an operative range. However, due to excessively long treatment times required at the low concentration range and sludge formation and difficulties in use of the solution at the higher concentrations, a preferred range is from about 0.10 to 0.50 moles per liter and the most preferred range is from about 0.15 to 0.35 moles per liter.

The treatment solution is an aqueous alkaline solution having pH adjusted to between about 10 and 13 and preferably, between about 11 and 12. To obtain desired pH, a pH adjustor is used such as hydroxide. Alkali and alkaline earth metal hydroxides are suitable, sodium and potassium hydroxides being the most preferred materials. The amount of pH adjustor used is that amount that gives the desired pH.

To hold the pH at the desired level, a buffering system may be used. A preferred buffering system comprises the combination of a carbonate and a tribasic phosphate. This combination is preferred because the tribasic phosphate is also an inhibitor which prevents darkening of the coating formed on the surface of the aluminum part by the treatment solution and the carbonate appears to inhibit sludge formation.

The amount of the tribasic phosphate and carbonate is not critical, small amounts providing some benefit with larger amounts providing greater benefit. In general, the concentration may be as low as 0.01 moles per liter to saturation or even in excess of saturation. A preferred range for each is from 0.04 to 0.50 moles per liter. Alkali and alkaline earth metal salts of the phosphate and carbonate are preferred but not critical.

A preferred formulation in accordance with the invention is as follows:

Ferric citrate—0.1 to 0.5 moles per liter
Potassium Carbonate—0.1 to 0.5 moles per liter
Trisodium Phosphate—0.1 to 0.5 moles per liter
Water—To 1 liter The treatment solution of this invention may be used over a wide temperature range, but preferably is used below its boiling point within a temperature range of from about 70° to 120° F. and preferably from about 75° to 100° F. The time of contact of an aluminum part with the oxidizing solution is likewise not critical, periods of time ranging from 1 to 60 minutes being suitable and from 2 to 15 minutes being typical.

It should be understood that there is a relationship between concentration of ingredients in the treatment solution, temperature and time, more concentrated solutions or higher temperatures or a combination of the two resulting in shorter treatment time. It should further be understood that different aluminum alloys might require different treatment conditions. Finally, it should be realized that the conditions of treatment vary with the objectives to be obtained—that is, for more intense colors or better corrosion resistance, heavier coatings requiring longer treatment times may be needed. Consequently, routine experimentation within the guidelines set forth above may be required.

Following treatment with the solution of this invention, the aluminum part is rinsed and may be coated with a finish such as those disclosed in U.S. Pat. No. 2,796,371, or a solution of a colorant which is preferably an organic dye but which might be an inorganic pigment. Many of the colorants that may be used are those conventionally used in anodizing. Typical of such dyes are the following, set forth for purposes of example only:

Aluminum Orange 3A
Anthraqumone Green GNN—C.I. 61570
Alizarin Orange 2GN—C.I. 14010
Wool East Orange GA—C.I. 26520
Fast Mordant Yellow GD—C.I. 25100
Chromoxane Pure Blue BA—C.I. 43830
Chloranitine Fast Red 5BRL—C.I. 35780

The parts treated with the alkaline solution of the ferric citrate may be colored in accordance with prior art anodizing treatment procedures. Thus, dye concentration, treatment temperature and time are conventional, temperatures of from 130° to 150° F. being appropriate with treatment time ranging from about ½ to 30 minutes.

Following dyeing and a water rinse, the part may be sealed if desired, using the conventional sealing step of immersion of the colored part in a solution such as nickel acetate of sodium dichromate or any other conventional material in accordance with art-recognized procedures.

EXAMPLE 1

An aluminum panel measuring 2×4×0.016 inches may be prepared by soaking for five minutes in a conventional non-etching aluminum soak cleaner made up at 60 grams per liter and maintained at 150° F. The panel would then be removed, water rinsed and immersed in a conventional mild alkaline etching cleaner consisting of 55 grams of cleaner (Clepo No. 30R) dissolved in one liter of water. The cleaning bath should be maintained at about 150° F. The panel may then be removed after about one minute treatment and rinsed in cold water. The clean panel would then be immersed in a 10 percent nitric acid solution to desmut the same and provide a clean surface. A treatment time of one-half minute should be used. The clean panel would then be rinsed with cold water and would be ready for treatment in accordance with the invention.

A clean aluminum panel, such as prepared by the above procedure, is immersed in an aqueous solution comprising 50 grams of ferric citrate dissolved in one liter of water to which a 1 to 1 (molar ratio) mixture of trisodium phosphate and potassium carbonate is added in an amount sufficient to provide solution of pH of about 12.0. The temperature of the solution is held at about 72° F. and an aluminum part, such as the panel treated as above, is immersed in the solution for about 30 minutes. Thereafter it is removed and rinsed with water. The panel, having coating, is dyed by immersion for about two minutes in a dye bath of Mordant Orange 6 maintained at about 120° F. The pH of the dye is adjusted to between 6.0 and 7.0. The dyed panel is rinsed with water and then may be sealed in a solution containing 50 grams of sodium dichromate dissolved in one liter of water with the pH maintained at about 5.9. The time of sealing may be conveniently set at 15 minutes at a temperature of about 210° F. The panel may then be rinsed with water, dried in air and buffed by hand. It has a uniform brass coloration and good wear and corrosion resisting properties.

EXAMPLE 2

Following the procedure of Example 1, the formulation is altered by substituting sodium hydroxide to pH 12.0 for the carbonate/tribasic phosphate mixture. The results are not as good as color is less uniform and is dark and there is a rapid build-up of sludge.

It will be noted that the present invention provides a process for coating and coloring aluminum which is low in cost; does not require electrical equipment; and can be applied to small parts such as pins, bolts and the like. The colorant appears to be uniformly distributed throughout the coating and is adherent to the aluminum part. The resulting colored aluminum and aluminum alloys have a deep shade and are as or more attractive than coatings that have heretofore been used.

In a lesser preferred embodiment, the treatment step with the ferric citrate solution may be modified by use of an electric current to enhance the rate at which the coating would form. In this embodiment, the aluminum part would be the anode and the tank would be used as a cathode or a separate cathode inserted into the treatment solution. Passage of current between the electrodes would reduce the treatment time and in some cases, provide a harder coating. However, the benefits obtained from the use of an electric current do not justify the additional costs associated with its use.

I claim:

1. A process for forming a coating on an aluminum part that is corrosion resistant, receptive to coating and readily dyed, said process comprising the steps of cleaning the aluminum to the extent necessary and formation of said coating using chemical means consisting of contacting the surface of said aluminum part with an aqueous, alkaline solution of ferric citrate, said solution having a pH between about 10 and 13 and the ferric citrate being present in solution in an amount of at least 0.01 moles per liter of solution.

2. The process of claim 1 where the ferric citrate is present in an amount of from 0.1 to 0.5 moles per liter of solution.

3. The process of claim 2 including the step of contacting the aluminum part with a colorant solution following treatment with the ferric citrate solution.

4. The process of claim 3 where the contact time of the aluminum with the solution varies from about 1 to 60 minutes, the temperature of said solution is below the boiling point and the colorant solution is a dye.

5. The process of claim 4 where the temperature varies between about 70° and 100° F. and the contact time of the aluminum part with the ferric citrate is from about 1 to 15 minutes.

6. The process of claim 5 where the ferric citrate solution contains an inhibitor for aluminum that prevents darkening of the coating.

7. The process of claim 6 where the inhibitor is a tribasic phosphate contained in solution in an amount of from 0.01 moles per liter to saturation.

8. The process of claim 7 where the inhibitor is trisodium phosphate contained in solution in an amount from 0.04 to 0.50 moles per liter of solution.

9. The process of claim 4 where the ferric citrate solution contains a pH adjustor in an amount sufficient to provide the required pH and is selected from the group consisting of alkalai and alkaline earth metal carbonates, hydroxides, tribasic phosphates and mixtures thereof.

10. The process of claim 1 including the step of making the aluminum an anode and passing a current through the ferric citrate solution from a cathode to the aluminum anode.

11. In a process for coloring an aluminum part including the steps of cleaning the aluminum part to the extent necessary, forming a color receptive coating over the aluminum part and contacting the aluminum part with a colorant, the improvement comprising formation of said coating by chemical means consisting of contacting the surface of said aluminum with an aqueous, alkaline solution of ferric citrate, said solution consisting of at least 0.01 moles per liter of ferric citrate, a pH adjustor in an amount sufficient to provide required pH and an inhibitor for aluminum to prevent darkening of the coating, said aqueous, alkaline solution of the ferric citrate having a pH varying between about 10 and 13.

12. The process of claim 11 where the inhibitor is a tribasic phosphate contained in solution in an amount of at least 0.01 moles per liter.

13. The process of claim 11 where the aqueous, alkaline solution comprises ferric citrate in an amount from 0.1 to 0.5 moles per liter, potassium carbonate in an amount from 0.1 to 0.5 moles per liter, trisodium phosphate in an amount from 0.1 to 0.5 moles per liter and water to 1 liter.

14. The process of claim 13 where temperature of said ferric citrate solution is below the boiling point of said solution.

15. The process of claim 13 where the temperature of said ferric citrate solution varies from about 70° to 100° F.

16. The process of claim 13 where the temperature of said solution varies from between 70° to 100° F. and treatment time varies between 1 and 15 minutes.

17. An aqueous solution for coating aluminum and its alloys, said solution consisting essentially of a ferric citrate in an amount of at least 0.01 moles per liter, a pH adjustor in an amount sufficient to provide an alkaline solution having a pH varying between about 10 and 13, and an inhibitor to prevent darkening of the coating, said inhibitor being present in an amount of at least 0.01 moles per liter of solution.

18. The solution of claim 17 where the inhibitor is a tribasic phosphate.

19. The solution of claim 17 having the following composition:
Ferric Citrate: 0.1–0.5 moles per liter
Alkali metal carbonate: 0.1–0.5 moles per liter
Tribasic Phosphate: 0.1–0.5 moles per liter
Water: to 1 liter.

* * * * *